(12) United States Patent
Filippi et al.

(10) Patent No.: US 9,040,011 B2
(45) Date of Patent: May 26, 2015

(54) PROCESS FOR PRODUCING AMMONIA SYNTHESIS GAS

(75) Inventors: Ermanno Filippi, Castagnola (CH); Marco Badano, Lugano-Besso (CH); Geoffrey Frederick Skinner, Reading (GB)

(73) Assignee: Casale SA (CH)

( * ) Notice: Subject to any disclaimer, the term of this patent is extended or adjusted under 35 U.S.C. 154(b) by 548 days.

(21) Appl. No.: 12/744,748

(22) PCT Filed: Nov. 6, 2008

(86) PCT No.: PCT/EP2008/009341
§ 371 (c)(1),
(2), (4) Date: May 26, 2010

(87) PCT Pub. No.: WO2009/068159
PCT Pub. Date: Jun. 4, 2009

(65) Prior Publication Data
US 2010/0303703 A1      Dec. 2, 2010

(30) Foreign Application Priority Data

Nov. 27, 2007   (EP) .................................... 07022984

(51) Int. Cl.
*C01B 3/24*    (2006.01)
*C01C 1/04*    (2006.01)
(Continued)

(52) U.S. Cl.
CPC ............. *C01B 3/025* (2013.01); *C01C 1/0405* (2013.01); *C01B 3/382* (2013.01); *C01B 3/48* (2013.01);
(Continued)

(58) Field of Classification Search
CPC ............................. C01B 3/025; C01C 1/0405
USPC ................... 252/373, 374, 376; 423/359, 361
See application file for complete search history.

(56) References Cited

U.S. PATENT DOCUMENTS 2,789,094 A *   4/1957  Bois Eastman Du et al.   252/376
4,296,085 A     10/1981  Banquy
(Continued)

FOREIGN PATENT DOCUMENTS

| | | |
|---|---|---|
| DE | 1567608 A1 | 7/1970 |
| FR | 2671338 A1 | 7/1992 |
| GB | 1270756 A | 4/1972 |

OTHER PUBLICATIONS

Max Appl, Modern Ammonia Technology: Where have we got to, Where are we going?, Nitrogen No. 199, (1992), pp. 46-75.
(Continued)

*Primary Examiner* — Wayne Langel
(74) *Attorney, Agent, or Firm* — Akerman LLP

(57) ABSTRACT

The present invention concerns a process for producing ammonia synthesis gas from the reforming of hydrocarbons with steam in a primary reformer (1) equipped with a plurality of externally heated catalytic tubes and then in a secondary reformer (2) together with an oxidant gas. In this process, the reaction of said hydrocarbons with said steam in said primary reformer (1) is performed at an operating pressure of at least 45 bar in the catalytic tubes and a flow of essentially pure oxygen or oxygen-enriched air is added to said secondary reformer as oxidant gas for substantially reforming together with said all the hydrocarbons content of said product gas exiting the primary reformer (1). In the case essentially pure oxygen is used as oxidant gas, a flow of nitrogen is added downstream the secondary reformer (2) to reach a N2/H2 molar ratio corresponding to or close to the stoichiometric ratio for ammonia synthesis. This process allows to obtain high synthesis gas production capacities and lower investment and energy costs.

8 Claims, 1 Drawing Sheet

(51) Int. Cl.
*C01B 3/02* (2006.01)
*C01B 3/38* (2006.01)
*C01B 3/48* (2006.01)

(52) U.S. Cl.
CPC . *C01B 2203/0233* (2013.01); *C01B 2203/0244* (2013.01); *C01B 2203/025* (2013.01); *C01B 2203/0415* (2013.01); *C01B 2203/042* (2013.01); *C01B 2203/0435* (2013.01); *C01B 2203/047* (2013.01); *C01B 2203/0475* (2013.01); *C01B 2203/068* (2013.01); *C01B 2203/1235* (2013.01); *C01B 2203/142* (2013.01); *C01B 2203/147* (2013.01)

(56) References Cited

U.S. PATENT DOCUMENTS

| | | | | |
|---|---|---|---|---|
| 4,376,717 A | * | 3/1983 | Lagana' et al. | 252/376 |
| 4,376,758 A | * | 3/1983 | Pagani et al. | 423/359 |
| 4,572,829 A | * | 2/1986 | Fuderer | 423/359 |
| 4,578,214 A | * | 3/1986 | Jungerhans | 252/376 |
| 4,666,680 A | * | 5/1987 | Lewis | 422/628 |
| 4,792,441 A | * | 12/1988 | Wang et al. | 423/359 |
| 4,822,521 A | * | 4/1989 | Fuderer | 252/376 |
| 4,981,669 A | * | 1/1991 | Pinto | 423/359 |
| 5,004,592 A | * | 4/1991 | Pinto | 423/652 |
| 5,011,625 A | * | 4/1991 | Le Blanc | 252/376 |
| 5,122,299 A | * | 6/1992 | LeBlanc | 252/376 |
| 5,736,116 A | | 4/1998 | LeBlanc et al. | |
| 2009/0035206 A1 | | 2/2009 | Filippi | |

OTHER PUBLICATIONS

Ullmann's Encyclopedia of Industrial Chemistry, 5th Completely Revised Edition, vol. 2A, pp. 175-181 (1985).

Max Appl., Ammonia: Principles and Industrial Practice, Wiley VCH (1999), pp. 78 and 79.

\* cited by examiner

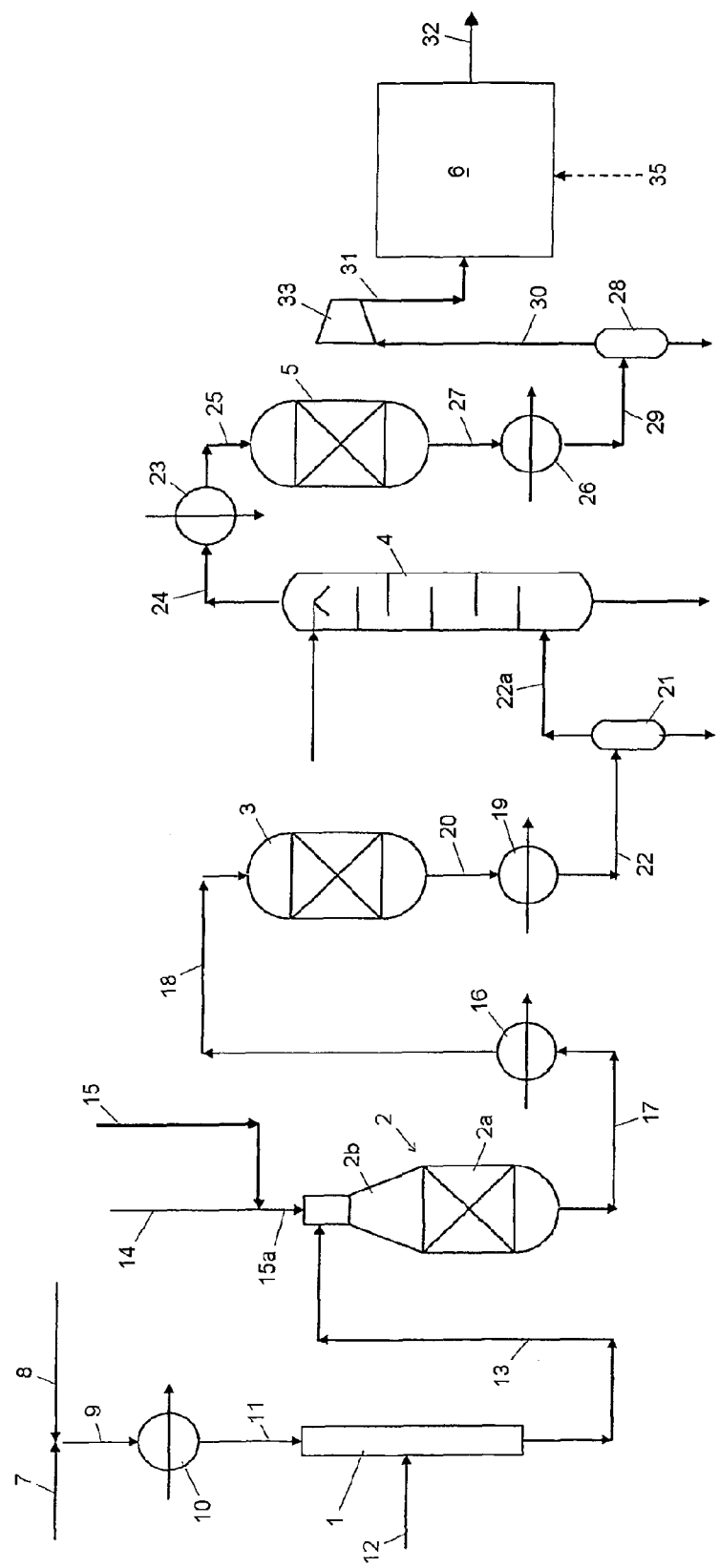

PROCESS FOR PRODUCING AMMONIA SYNTHESIS GAS

FIELD OF APPLICATION

In its most general aspect, the present invention concerns the preparation of synthetic gas mixtures required for the manufacture of ammonia.

In particular, the present invention concerns a process for producing ammonia synthesis gas comprising hydrogen (H2) and nitrogen (N2) obtained from the reforming of hydrocarbons.

The present invention also concerns a process for ammonia production from synthesis gas obtained from the reforming of hydrocarbons.

Throughout this specification and the appended claims, the term "hydrocarbons" is used to indicate generally a raw material source of hydrogen and carbon, such as for example methane, natural gas, naphtha, GPL (liquefied petroleum gas) or refinery gas and mixtures thereof.

As known, in the field of synthesis gas production, more and more the need is felt of realizing processes which are easy to implement and allow to reach higher and higher production capacities with low operating and investment costs and low energy consumption.

PRIOR ART

As it is well known in the art, the production of synthesis gas for ammonia is mainly performed by a combined reforming process in which desulphurized hydrocarbons are mixed with steam in a suitable ratio and the resulting mixture is admitted at a primary reformer in which most of the hydrocarbons in the feed are steam reformed (converted) into a mixture of carbon monoxide, carbon dioxide and hydrogen by passage over a suitable catalyst at moderate pressures, generally in the range of 15 to 35 bar, and high temperatures in the range of 780° C. to 820° C.

As said conversion is endothermic, the catalyst is contained in a multiplicity of catalytic tubes which are heated externally by the heat of reaction supplied by the combustion of a gaseous fuel with air at atmospheric temperature.

The gas product exiting the primary reformer is fed to a secondary reformer usually containing a suitable catalyst in a catalytic bed and a reaction space overlying the catalytic bed, the secondary reformer also receiving a flow of air in a controlled amount to supply the nitrogen required for the downstream ammonia synthesis.

The oxygen reacts in the reaction space above the catalyst bed with the combustible components of the product gas coming from the Primary Reformer and the resulting combined product gas enters the catalyst bed at elevated temperature.

During passage down through the catalyst, the residual methane reacts endothermically with steam, resulting in a typical exit temperature of the Secondary Reformer outlet gas of around 900 to 1000° C. with around 99% of the hydrocarbons feed converted to carbon oxides and hydrogen.

The reformed gas exiting the secondary reformer is then typically treated in a series of down-stream equipments to remove carbon oxides and obtain a gas composition suitable for ammonia synthesis (i.e. having a H2/N2 molar ratio close to 3:1). These equipments include:

CO shift converters in which most of the carbon monoxide content (CO) of the reformed gas is catalytically converted with unreacted steam to carbon dioxide plus an additional volume of hydrogen, CO2 washing column in which the carbon dioxide content is almost completely removed by scrubbing the gas with an appropriate solvent such as an aqueous solution of an amine or of potassium carbonate, so obtaining a gas flow comprising nitrogen and hydrogen in an approximately 3:1 H2/N2 molar ratio and traces of methane, carbon oxides and argon.

Methanator reactor in which the residual carbon oxides are catalytically converted to methane to avoid poisoning of the downstream ammonia synthesis catalyst by those oxygen-containing compounds.

In this way, a final ammonia synthesis gas at low pressure is obtained (typically 15-25 bar) which needs to be compressed to the pressure required for ammonia synthesis, this pressure being generally in the range of 80 to 300 bar, typically around 150 bar, according to the ammonia synthesis process to be used.

Although advantageous on several aspects, the ammonia synthesis gas process described above suffers the recognized drawback that it is difficult to implement in large-capacity ammonia plants.

In this case, the main difficulty is that of designing and manufacturing an appropriate compressor and its turbine for compressing the very high synthesis gas flow required for large-capacity ammonia plants from its low pressure to the high pressure required for ammonia synthesis.

In addition, for large capacity ammonia plants, the other equipments and pipework are required to be of a very large size at the operating conditions (in particular pressure) of the synthesis gas process described above. However, this would increase too much both investment and energy costs and consequently the synthesis gas production capacity is limited.

SUMMARY OF THE INVENTION

The problem underlying the present invention is to provide a process for producing synthesis gas suitable for ammonia production which is easy to implement and allows to obtain high production capabilities with low operating and investments costs as well as with low energy consumption.

This problem is solved by a process for producing ammonia synthesis gas, the process comprising the steps of:

feeding a gas flow comprising hydrocarbons and a gas flow comprising steam to a primary reformer equipped with a plurality of externally heated catalytic tubes, reacting said hydrocarbons with said steam in the catalytic tubes of said primary reformer at an operating pressure of at least 45 bar in the catalytic tubes, obtaining a product gas, feeding said product gas and a flow of oxidant gas to a secondary reformer, subjecting said product gas to reaction with said oxidant gas and then to secondary reforming so as to substantially reform all the hydrocarbons content of said product gas exiting the primary reformer and obtain a reformed gas comprising hydrogen, carbon oxides and unreacted steam and also having a content of nitrogen from 0 to the content required for a H2/N2 molar ratio in said reformed gas close to the stoichiometric ratio for ammonia synthesis, removing carbon oxides from said reformed gas and optionally feeding nitrogen gas in an amount to reach a H2/N2 molar ratio corresponding to or close to the stoichiometric ratio for ammonia synthesis, obtaining said synthesis gas.

The term "product gas" as used herein indicates a partially reformed gas as obtained for example at the outlet of the primary reformer or in the reaction space of the secondary reformer which normally comprises carbon oxides (CO and $CO_2$), hydrogen ($H_2$), steam and unconverted hydrocarbons.

The term "synthesis gas" as used herein indicates a gas comprising $N_2$ and $H_2$ in a appropriate molar ratio for ammonia synthesis, that is to say that said gas has a $N_2/H_2$ corresponding or close to the stoichiometric 1:3 molar ratio.

The term "reformed gas" as used herein indicates a fully reformed gas as obtained for example at the outlet of the secondary reformer which normally comprises, hydrogen, carbon oxides and unreacted steam and possibly nitrogen and traces of unconverted hydrocarbons.

According to an embodiment of the present invention, said oxidant gas is oxygen-enriched air having an appropriate $N_2/O_2$ molar ratio to substantially reform all the hydrocarbons content of said product gas exiting the primary reformer and obtain a $H_2/N_2$ molar ratio in said reformed gas close to the stoichiometric ratio for ammonia synthesis. In this embodiment, there is no feed of nitrogen gas downstream the secondary reformer as the reformed gas exiting the secondary reformer is already obtained with a $H_2/N_2$ molar ratio close to the stoichiometric ratio for ammonia synthesis.

According to another embodiment of the present invention, said oxidant gas is essentially pure oxygen. In this embodiment, as the reformed gas exiting the secondary reformer is essentially free of nitrogen, nitrogen gas is added downstream the secondary reformer to obtain a $H_2/N_2$ molar ratio close to the stoichiometric ratio for ammonia synthesis.

The present invention is based on the finding that it is possible to obtain a ammonia synthesis gas at high pressure and at the same time with high production capacities by increasing the operating pressure in the catalytic tubes of the primary reformer to at least 45 bar and by supplying more oxidant agent to the secondary reformer compared to the prior art processes. In fact, the hydrocarbons content of the product gas exiting the primary reformer is higher than the prior art processes described above, as a result of operating the primary reformer at an increased pressure and at possibly reduced temperature, and therefore more oxidant agent—onstituting the oxidant gas feed (flow) itself or contained in the oxidant gas feed—is required to fully convert (reform) the hydrocarbons contained in the product gas exiting the primary reformer.

In doing so, according to the invention, the necessary $N_2$ for ammonia synthesis may be provided with the oxidant gas flow in the secondary reformer and/or as a separate feed downstream the secondary reformer.

This finding is in contrast with the constant teaching of the prior art according to which, in order to obtain high production capacities of ammonia synthesis gas, the usual reforming pressure of around 35 bar is retained resulting in equipments (in particular compressor) and pipework of the related plant of very large size.

Surprisingly, according to the process of the invention, the feasible increase in pressure is particularly large as it is possible for instance to substantially double the operating pressure in the catalytic tubes compared to the prior art processes (to obtain an operating pressure of 60 bar for instance) without the need of changing the design of the tubes currently used in the primary reformer.

Preferably, according to the invention, the operating pressure in the catalytic tubes of the primary reformer is in the range of 45-100 bar, most preferably in the range of 60-80 bar.

According to the invention, the outlet temperature of the gas product exiting the tubes of the primary reformer is in the range of 650-850° C. Preferably, in order to avoid a possible reduction of the tubes lifetime under the new operating pressures of the invention, the tubes are heated in such a way to obtain a outlet temperature not exceeding 800° C. (preferably 700-770° C.) for the product gas exiting said tubes.

The choice of the outlet temperature from the tubes depends on the operating pressure within the tubes and it decreases as the operating pressure increases so as to maintain a high tube lifetime.

For instance, in the case of catalytic tubes of conventional internal diameter (e.g. of around 100 mm) and wall thickness of 10-12 mm which are operated, according to the invention, at 60 bar pressure/750° C. outlet temperature, it has been found that the tubes shows a predicted life of the tubes that is no less than the value of 1000,000 hours, which is generally accepted for reformers operating at conventionally lower pressures.

Furthermore, the final synthesis gas is obtained by the process according to the invention with a high pressure and this allows to employ smaller equipment and piping downstream the reformers, so reducing both investment and energy costs.

In particular, it is possible to employ smaller and less expensive equipments for compressing the final synthesis gas to the pressure required for conversion into ammonia in a synthesis loop of a ammonia plant. In addition, the energy required for this compression is reduced as the final synthesis gas is already obtained with a high pressure at the outlet of the reforming process. Therefore, a reduction of the energy consumption in a ammonia plant employing high pressure synthesis gas obtained according to the invention can also be achieved.

According to an aspect of the process according to the invention, when oxygen-enriched air is used as oxidant gas, it has preferably a $O_2$ content from 22 to 50 in mol % and it is supplied to the secondary reformer in a ratio of 0.35 to 0.5 mol of oxygen content of the enriched air stream per mol of carbon in hydrocarbons entering the primary reformer (or a pre-reformer, if used).

In the present invention, the feed of oxygen-enriched air to the secondary reformer may be obtained by mixing separate flows of air and oxygen outside the secondary reformer and by feeding the resulting mixing flow to the secondary reformer.

Alternatively, the feed of oxygen-enriched air may be provided "in situ" by feeding separate flows of air and oxygen to the secondary reformer that will mix inside the secondary reformer.

In a further embodiment, an oxidant stream having a higher oxygen concentration that air may be made directly from air by a separation process, such as distillation or adsorption, without an intermediate of producing essentially pure oxygen.

According to another aspect of the present invention, when essentially pure oxygen is used as oxidant gas, it is supplied to the secondary reformer in a ratio of 0.30 to 0.50 mol of oxygen per mol of carbon in hydrocarbons entering the primary reformer (or a pre-reformer, if used).

In the present invention, the term "essentially pure oxygen" means a content of oxygen in the respective oxidant gas of at least 95%.

The use of essentially pure oxygen or oxygen-enriched air allows to effectively convert the hydrocarbons (in particular methane) contained in the primary reformer outlet gas (the hydrocarbon content being increased as a result of both the increased pressure and reduced temperature in the primary reformer) in the space above the catalytic bed of the secondary reforming to produce carbon oxides and steam, so obtaining a product gas at elevated temperature.

Then, such product gas passes through the catalytic bed of the secondary reformer where endothermically reforming reaction occurs (exploiting the heat content of said product gas) which substantially completes the reforming process so achieving advantageously a overall hydrocarbon conversion yield which is fully comparable with that of the prior art reforming processes.

According to another aspect of the present invention, said step of removing carbon oxides from said reformed gas comprises the following operative stages:

- substantially removing carbon monoxide from said reformed gas by catalytic conversion with unreacted steam into carbon dioxide and hydrogen, so obtaining a reformed gas essentially deprived of carbon monoxide and some steam,
- substantially removing carbon dioxide from said reformed gas essentially deprived of carbon monoxide and some steam to obtain a reformed gas still including traces of carbon oxides.
- removing said traces of carbon dioxide by catalytic conversion to methane.

According to the invention, said step of removing carbon dioxide may be performed by scrubbing reformed gas essentially deprived of carbon monoxide and some steam with a suitable solution or by passing said reformed gas essentially deprived of carbon monoxide and some steam through a molecular sieve of the TSA or PSA type.

Appropriate scrubbing solutions include aqueous solutions of an amine or potassium carbonate or a physical solvent like methanol.

The term "molecular sieves" as used herein includes all materials having micropores suitable to preferentially adsorb carbon dioxide from a gas mixture containing it. According to the procedure of adsorption and release of carbon dioxides, these materials are classified as PSA (pressure swing adsorption) molecular sieves or TSA (temperature swing adsorption) molecular sieves.

According to the PSA procedure, a gaseous mixture containing carbon dioxide is allowed to pass through the PSA molecular sieve under pressure, thereby obtaining a preferential adsorption of carbon dioxide in the micropores of the molecular sieve. Then, the pressure is reduced to de-adsorb carbon dioxide from micropores, thereby regenerating the molecular sieve.

Differently, according to the TSA procedure, the adsorption of carbon dioxide is obtained by passing the gaseous mixture containing it through a TSA molecular sieve at a prefixed temperature. Then, the temperature is increased, for example through a flow of synthesis gas, so as to de-adsorb carbon dioxide from micropores, thereby regenerating the molecular sieve.

The present invention also concerns a process for producing ammonia from synthesis gas comprising the steps of:

- feeding a gas flow comprising hydrocarbons and a gas flow comprising steam to a primary reformer equipped with a plurality of externally heated catalytic tubes,
- reacting said hydrocarbons with said steam in the catalytic tubes of said primary reformer at an operating pressure of at least 45 bar in the catalytic tubes, obtaining a product gas,
- feeding said product gas and a flow of oxidant gas to a secondary reformer,
- subjecting said product gas to reaction with said oxidant gas and then to secondary reforming so as to substantially reform all the hydrocarbons content of said product gas exiting the primary reformer and obtain a reformed gas comprising hydrogen, carbon oxides and unreacted steam and also having a content of nitrogen from 0 to the content required for a H2/N2 molar ratio in said reformed gas close to the stoichiometric ratio for ammonia synthesis,
- removing carbon oxides from said reformed gas and optionally feeding nitrogen gas in an amount to reach a H2/N2 molar ratio corresponding to or close to the stoichiometric ratio for ammonia synthesis, obtaining said synthesis gas.
- reacting said synthesis gas in an ammonia synthesis loop under conditions effective to obtain ammonia.

The characteristics and advantages of the invention will further result from the following description of an embodiment thereof given by way of non limiting example with reference to the attached drawing.

BRIEF DESCRIPTION OF THE FIGURE

The FIGURE shows schematically a plant for producing ammonia synthesis gas according to the present invention, said plant being shown in fluid communication with an ammonia synthesis loop of an ammonia plant.

DETAILED DESCRIPTION OF A PREFERRED EMBODIMENT

In the FIGURE, a plant is shown schematically that illustrates the process steps according to the present invention for producing ammonia synthesis gas through primary and secondary reforming of a gaseous flow comprising hydrocarbons. In the process illustrated hereafter, the raw material employed as a source of hydrocarbons consists of natural gas.

With reference to FIG. 1, reference number 1 indicates a primary reformer, reference number 2 indicates a secondary reformer, reference number 3 indicates a series of CO shift converters (which only one is shown of), reference number 4 indicates a CO2 washing column, reference number 5 indicates a methanator and block 6 indicates a ammonia synthesis loop of a ammonia plant.

The low line 7 indicates a gas flow of natural gas which has been previously deprived of sulphur in a conventional manner and the flow line 8 indicates a flow gas of steam.

The desulphurized natural gas flow 7 is mixed with the steam flow 8 in a ratio of approximately 3 to 4 mols of steam per mol of carbon in natural gas and the resulting mixture is fed, through the flow line 9, to a heat exchanger 10, where it is pre-heated to a temperature of around 500-600° C. and the pre-heated mixture is fed, through the flow line 11 to the primary reformer 1.

The primary reformer 1 comprises internally a plurality of tubes (not shown) filled with a suitable catalyst, per se conventional, which are externally heated through a thermal exchange fluid indicated by the flow line 12.

According to the present invention, the catalytic tubes in the primary reformer are heated so as to have a outlet temperature from the tubes in the range of 700-770° C. while the gas mixture comprising hydrocarbons and steam fed to the primary reformer 1 enters the tubes to an operating pressure of above 60 bar, preferably of about 65 bar.

In addition, in the present example, all the natural gas feed is supplied to the primary reformer 1.

The product gas exiting the primary reformer 1 at a temperature of 700-770° C. and a pressure of above 60 bar (e.g. about 65 bar), is supplied, through the flow line 13, to the secondary reformer 2 which also receives an oxidant flow gas consisting of oxygen-enriched air supplied through the flow line 15a in a appropriate amount to have a H2/N2 molar ratio corresponding to or close to the stoichiometric ratio for ammonia synthesis.

In this embodiment, the oxygen-enriched air flow 15a fed to the secondary reformer 2 is obtained by mixing a flow 14 of air and a flow 15 of oxygen outside the secondary reformer 2.

According to another embodiment of the present invention (not shown), the feed of oxygen-enriched air to the secondary reformer is provided "in situ" by feeding separate flows of air and oxygen (such as the above mentioned flows 14 and 15) to the secondary reformer. These flows will mix inside the secondary reformer 2 in a reaction space near to the inlet of said gases, for example the reaction space 2b.

According to the present invention, the feed of oxygen-enriched air to the secondary reformer compensates the increased hydrocarbon content in the product gas exiting the primary reformer, as a result of using both an increased pressure and a reduced temperature with respect to the prior art.

In particular, the secondary reformer 2 includes, in this example, a catalytic bed 2a of a suitable catalyst (for example a nickel-based catalyst) and an overlying reaction space 2b. The oxygen-enriched air fed to the secondary reformer 2 reacts with the product gas exiting the primary reformer 1 in the reaction space 2b to produce a second gas product at elevated temperature.

Then, such a second product gas passes through the catalytic bed 2a of the secondary reformer where endothermically reforming reaction occurs (exploiting the heat content of said second product gas) which substantially completes the reforming process, so obtaining a reformed gas comprising nitrogen, hydrogen, carbon oxides and residual steam.

According to another embodiment of the invention (not shown), the secondary reformer 2 may be free of catalytic bed 2a. In this case, it will include one or more reaction spaces, as the reaction space 2b indicated above, for carrying out and completing the reforming process.

The final reformed gas exiting the secondary reformer 2 has a temperature of around 1000° C. and a pressure of around 60 bar. It is supplied first to a heat exchanger 16, through the flow line 17, where it is cooled to a temperature of around 350° C. and then to a series (normally two) of CO shift converters 3, through the flow line 18.

In the CO shift converters 3, the carbon monoxide content of the reformed gas is catalytically converted with unreacted steam to carbon dioxide plus and additional volume of hydrogen. The outlet condition from the last (second) CO shift converter 3 is around 220° C. with around 98% of the inlet CO converted. The reformer gas exiting the last CO shift converter 3 is fed to a heat exchanger 19 (through the flow line 20) where it is cooled to near ambient temperature and the cooled gas is fed to a separator 21 (through the flow line 22) for separation of condensate.

The gas leaving the separator 21 flows, through the flow line 22a, to a CO2 washing column 4 in which most of the carbon dioxide content is almost completely removed by scrubbing with an appropriate solution such as an aqueous solution of an amine or of potassium carbonate or a physical solvent like pure methanol. Alternatively, according to another embodiment of the invention (not shown), the gas leaving the separator 21 may be allowed to pass through a molecular sieve of the PSA or TSA type for removing most of its carbon dioxide content.

The outlet gas flow from the top of the column 4 consists essentially of hydrogen and nitrogen in an approximately 3:1 molar ratio with traces of hydrocarbons (methane) and carbon oxides.

This gas is fed, through the flow line 24, to a heat exchanger 23, where it is heated to a temperature of around 300° C., and then to the methanator reactor 5 through the flow line 25. The methanator reactor 5 contains a bed of an appropriate catalyst, for example a nickel-based catalyst, for converting the traces of carbon oxides to methane so avoiding poisoning of the down-stream ammonia synthesis catalyst by these oxygen-containing compounds.

The gas exiting the methanator reactor 5 is cooled in a heat exchanger 26, in which it is fed through the flow line 27, and the cooled gas is fed to a separator 28, through the flow line 29, for separating condensate.

The resulting ammonia synthesis gas is then fed to a compressor 33 (through the flow line 30) where it is compressed to the pressure required for ammonia synthesis for example 150 bar.

Since, according to the present invention, the ammonia synthesis gas is obtained with a higher pressure than the prior art (in this example above 60 bar such as around 65 bar), lower installation and operating costs are advantageously obtained in connection with the compressor 33.

Finally, the final synthesis gas is supplied to the synthesis loop 6, through the flow line 31, where it is reacted in conditions effective to produce ammonia. The ammonia so obtained is discharged form the synthesis loop 6 through the flow line 32.

According to another embodiment of the present invention (partially shown by a broken line), the secondary reformer 2 is fed with oxygen as oxidant gas (for example through the flow line 15) and a flow 35 of nitrogen is fed to the synthesis loop 6 in an amount to reach a H2/N2 molar ratio corresponding to or close to the stoichiometric ratio for ammonia synthesis. In this case, such flow 35 may be fed for example to the reactor of the synthesis loop 6 or in general in any place of the plant downstream the secondary reformer 2.

According to a still further embodiment of the present invention, a pre-reformer is provided downstream to the primary reformer 1. Such a pre-reformer, which is per-se of conventional type and thus it is not shown in FIG. 1, is operated in an adiabatic manner, i.e. without heat exchange. The pre-reformer is fed with the flow of natural gas 7 and part of the steam flow 8. In the pre-reformer, a gas flow comprising hydrocarbons is obtained, which is fed, together with the remaining part of the steam flow 8, to the primary reformer 1.

Of course, a man skilled in the art can bring numerous modifications and alternatives to the process according to the invention, all of which are covered by the scope of protection of the following claims.

The invention claimed is:

1. A process for producing ammonia synthesis gas, the process comprising the steps of:
   feeding a gas flow comprising hydrocarbons and a gas flow comprising steam to a primary reformer equipped with a plurality of externally heated catalytic tubes,
   reacting said hydrocarbons with said steam in the catalytic tubes of said primary reformer at an operating pressure of at least 45 bar in the catalytic tubes, obtaining a product gas,
   feeding said product gas and a flow of oxidant gas to a secondary reformer,
   subjecting said product gas to reaction with said oxidant gas and then to secondary reforming so as to reform all the hydrocarbons content of said product gas exiting the primary reformer and obtain a reformed gas comprising hydrogen, carbon oxides and unreacted steam,
   removing carbon oxides from said reformed gas, obtaining a synthesis gas suitable for synthesis of ammonia, wherein said oxidant gas is oxygen-enriched air having an appropriate $N_2/O_2$ molar ratio to obtain a reformed gas having a content of nitrogen corresponding to the content required for the stoichiometric $H_2/N_2$ molar ratio for ammonia synthesis.

2. The process according to claim 1, said oxygen-enriched air having a $O_2$ content from 22 to 50 in mol % and being supplied to the secondary reformer in a ratio of 0.35 to 0.5 mol of oxygen content of the enriched air stream per mol of carbon in hydrocarbons entering the primary reformer or a pre-reformer if used.

3. The process according to claim 1, said operating pressure in the catalytic tubes of the primary reformer being in the range of 45-100 bar.

4. The process according to claim 1, the outlet temperature of said gas product from the tubes of the primary reformer being in the range of 650-850° C.

5. The process according to claim 4, said outlet temperature being in the range of 700-770° C.

6. The process according to claim 1, said step of removing carbon oxides from said reformed gas comprising the following operative stages:

removing carbon monoxide from said reformed gas by catalytic conversion with unreacted steam into carbon dioxide and hydrogen, so obtaining a reformed gas essentially deprived of carbon monoxide and some steam, removing carbon dioxide from reformed gas essentially deprived of carbon monoxide and some steam to obtain a reformed gas still including traces of carbon oxides, removing said traces of carbon dioxide by catalytic conversion to methane.

7. The process according to claim 3, wherein said operating pressure in the catalytic tubes of the primary reformer is in the range of 60-80 bar.

8. The process for producing ammonia from ammonia synthesis gas, the process comprising the steps of obtaining ammonia synthesis gas according to claim 1, and reacting said synthesis gas in an ammonia synthesis loop under conditions effective to obtain ammonia.

\* \* \* \* \*